(12) United States Patent
Timken et al.

(10) Patent No.: US 8,673,800 B2
(45) Date of Patent: Mar. 18, 2014

(54) HYDROLYSIS OF USED IONIC LIQUID CATALYST FOR DISPOSAL

(75) Inventors: Hye-Kyung Timken, Albany, CA (US); Shawn Stephen Healy, Eagle Mountain, UT (US); Shawn Shlomo Winter, Salt Lake City, UT (US)

(73) Assignee: Chevron U.S.A. Inc., San Ramon, CA (US)

( * ) Notice: Subject to any disclaimer, the term of this patent is extended or adjusted under 35 U.S.C. 154(b) by 26 days.

(21) Appl. No.: 13/396,121

(22) Filed: Feb. 14, 2012

(65) Prior Publication Data

US 2013/0211175 A1    Aug. 15, 2013

(51) Int. Cl.
*B01J 31/00*  (2006.01)
*B01J 38/00*  (2006.01)

(52) U.S. Cl.
USPC ............. 502/22; 502/25; 502/26; 588/317

(58) Field of Classification Search
USPC ........................................... 502/22, 25, 26
See application file for complete search history.

(56) References Cited

U.S. PATENT DOCUMENTS

| | | | |
|---|---|---|---|
| 6,103,908 A | 8/2000 | Bahrmann et al. | |
| 7,727,925 B2 | 6/2010 | Elomari et al. | |
| 7,807,597 B2 | 10/2010 | Elomari et al. | |
| 7,884,045 B2 | 2/2011 | Harris et al. | |
| 2006/0260064 A1 | 11/2006 | Luckman et al. | |
| 2007/0142213 A1 | 6/2007 | Elomari et al. | |
| 2007/0142215 A1* | 6/2007 | Harris et al. | 502/53 |
| 2007/0249485 A1* | 10/2007 | Elomari et al. | 502/20 |
| 2008/0044357 A1 | 2/2008 | Wang et al. | |
| 2008/0251759 A1 | 10/2008 | Kalb et al. | |
| 2010/0126948 A1 | 5/2010 | Luo et al. | |
| 2010/0129921 A1* | 5/2010 | Timken et al. | 436/96 |
| 2010/0147740 A1 | 6/2010 | Elomari et al. | |
| 2010/0160145 A1 | 6/2010 | Hommeltoft | |
| 2011/0000782 A1 | 1/2011 | Reddy et al. | |
| 2011/0111508 A1 | 5/2011 | Timken et al. | |
| 2011/0152566 A1 | 6/2011 | Bourgeois et al. | |
| 2011/0297618 A1 | 12/2011 | Luo et al. | |

FOREIGN PATENT DOCUMENTS

| | | |
|---|---|---|
| CN | 102234170 | 11/2011 |
| IN | 2017MUM2008 | 2/2009 |
| WO | WO0115175 | 3/2001 |
| WO | WO2009102419 | 8/2009 |

OTHER PUBLICATIONS

Emory University—Department of Chemistry, Chemical Waste Disposal Guidelines, www.ehso.emory.edu.
PCT/US13/24728 Search Report and Written Opinion mailed Apr. 12, 2003, 22 pages.

* cited by examiner

*Primary Examiner* — Steven Bos
(74) *Attorney, Agent, or Firm* — Susan M. Abernathy

(57) ABSTRACT

We provide a process and apparatus for preparing a used catalyst for disposal, comprising:
  a. hydrolyzing a used ionic liquid catalyst comprising an anhydrous metal halide to produce a hydrolyzed product; and
  b. separating the hydrolyzed product into a liquid phase and a solid phase; wherein the liquid phase comprises a non-water-reactive aqueous phase and a hydrocarbon phase; and wherein the solid phase comprises a solid portion of the hydrolyzed product, that is not water reactive. A vessel is used for the hydrolyzing and a separator is used for the separating.

16 Claims, 1 Drawing Sheet

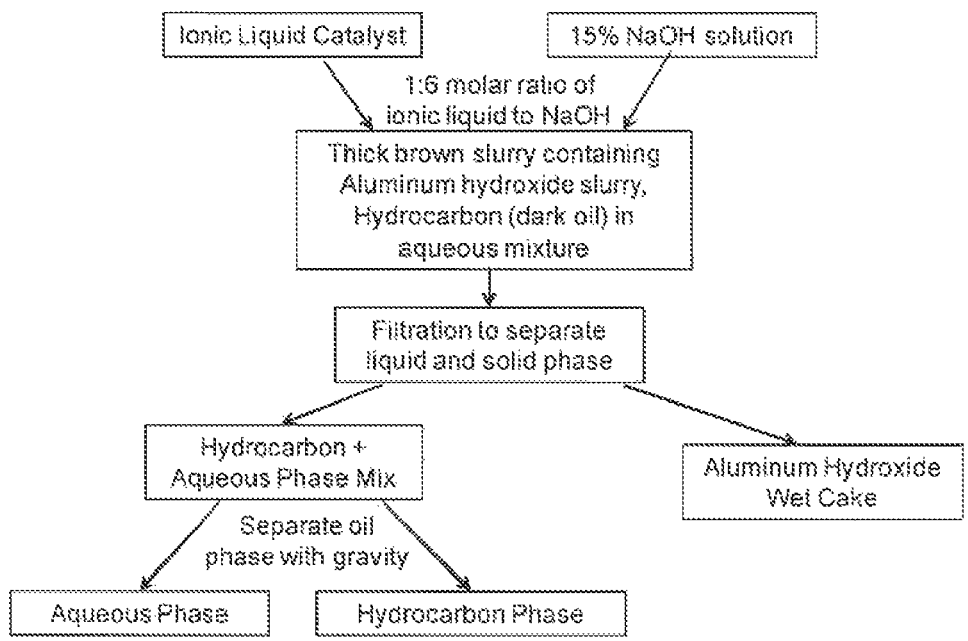

HYDROLYSIS OF USED IONIC LIQUID CATALYST FOR DISPOSAL

TECHNICAL FIELD

This application is directed to a process and apparatus for preparing a used ionic liquid catalyst for disposal.

BACKGROUND

Ionic liquid catalysts need to be safely disposed of after use. Without treatment, they can be highly water reactive and unsafe to handle or dispose of.

SUMMARY

This application provides a process and apparatus for preparing a used catalyst for disposal, comprising:
a. hydrolyzing a used ionic liquid catalyst comprising an anhydrous metal halide to produce a hydrolyzed product; and
b. separating the hydrolyzed product into a liquid phase and a solid phase; wherein the liquid phase comprises a non-water-reactive aqueous phase and a hydrocarbon phase; and wherein the solid phase comprises a solid portion of the hydrolyzed product, that is not water reactive. The apparatus comprises a vessel used to hydrolyze the used ionic liquid catalyst and a separator.

BRIEF DESCRIPTION OF THE DRAWINGS

FIG. 1 is a diagram of a flow chart with one embodiment for hydrolysis of ionic liquid catalyst.

DETAILED DESCRIPTION

Anhydrous metal-halide-containing used ionic liquid catalyst is treated for safe and economic disposal by hydrolyzing the used ionic liquid catalyst followed by separation which produces a non-water-reactive aqueous phase, a hydrocarbon phase and a solid phase.

Prior to the treatment by the process the used catalyst is water reactive and unsuitable for disposal by usual methods. "Water reactive" means that the composition will violently react with moisture, sometimes leading to release of toxic gases, explosions, or fire. Water reactive substances are dangerous when wet because they undergo a chemical reaction with water. This reaction can release a gas that presents a toxic health hazard. In addition, the heat generated when water contacts such materials is often enough for the mixture to spontaneously combust or explode.

Ionic Liquid Catalyst

Ionic liquid catalysts comprising an anhydrous metal halide are very effective for catalyzing a hydrocarbon conversion process. Examples of hydrocarbon conversion processes are paraffin alkylation, olefin dimerization, olefin oligomerization, concurrent alkylation and oligomerization, isomerization, and aromatic alkylation. The hydrocarbon conversion process can be one used to make gasoline, middle distillate, base oil, or petrochemical components.

The ionic liquid catalyst comprising an anhydrous metal halide is composed of at least two components which form a complex. The first component of the ionic liquid catalyst comprises an anhydrous metal halide Which provides Lewis Acid functionality to the catalyst. The metal halide is selected from compounds of Group 13 metals, including anhydrous aluminum halides, alkyl aluminum halide, gallium halide, and alkyl gallium halide. Specific metal halides, such as $AlCl_3$, $AlBr_3$, $GaCl_3$, $GaBr_3$, $InCl_3$, $InBr_3$, and mixtures thereof could be in the used ionic liquid catalyst. The periodic table by the International Union of Pure and Applied Chemistry (IUPAC), version date 22 Jun. 2007, is used for defining the Group 13 metals.

In order to maintain the catalytic activity of the anhydrous metal halide containing ionic liquid catalyst, the metal halide is kept in an anhydrous condition. Anhydrous metal halides are water reactive which means the anhydrous metal halides react with moisture in the atmosphere, in hydrocarbon feeds, or in water. The reaction with moisture tends to be very vigorous and generates toxic hydrogen halide gas and the reaction converts a portion or all of the metal halides into metal hydroxide and hydrated metal halides.

The second component making up the ionic liquid catalyst is an organic salt or mixture of salts. These salts can be characterized by the general formula Q+A−, wherein Q+ is an ammonium, phosphonium, boronium, iodonium, or sulfonium cation and A− is a negatively charged ion such as $Cl^-$, $Br^-$, $ClO_4^-$, $NO_3^-$, $BF_4^-$, $BCl_4^-$, $PF_6^-$, $SbF_6^-$, $AlCl_4^-$, $TaF_6^-$, $CuCl_2^-$, $FeCl_3^-$, $HSO_3^-$, $RSO_3^-$, $SO_3CF_3^-$, alkyl-aryl sulfonate, and benzene sulfonate (e.g., 3-sulfurtrioxyphenyl). In one embodiment the second component is selected from those having quaternary ammonium halides containing one or more alkyl moieties having from about 1 to about 12 carbon atoms, such as, for example, trimethylamine hydrochloride, methyltributylammonium halide, or substituted heterocyclic ammonium halide compounds, such as hydrocarbyl-substituted-pyridinium halide compounds for example 1-butylpyridinium halide, benzylpyridinium halide, or hydrocarbyl-substituted-imidazolium halides, such as for example, 1-ethyl-3-methyl-imidazolium chloride.

In one embodiment, the second component making up the ionic liquid catalyst is an organic salt that is hygroscopic in nature and has a tendency to attract and hold water molecules from the surrounding environment. With these ionic liquid catalysts, in order to maintain the integrity of the ionic liquid catalyst and its catalytic performance, both the anhydrous metal halides and the organic salts are thoroughly dried before the catalyst synthesis, and moisture-free conditions are maintained during the catalytic reaction.

In one embodiment the ionic liquid catalyst is selected from the group consisting of hydrocarbyl-substituted-pyridinium chloroaluminate, hydrocarbyl-substituted-imidazolium chloroaluminate, quaternary amine chloroaluminate, trialkyl amine hydrogen chloride chloroaluminate, alkyl pyridine hydrogen chloride chloroaluminate, and mixtures thereof. For example, the used ionic liquid catalyst can be an acidic haloaluminate ionic liquid, such as an alkyl substituted pyridinium chloroaluminate or an alkyl substituted imidazolium chloroaluminate of the general formulas A and B, respectively.

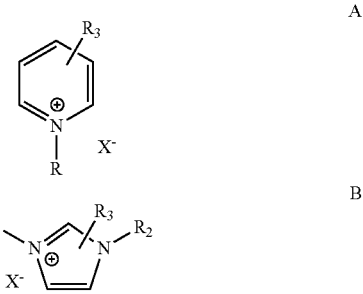

In the formulas A and B; R, $R_1$, $R_2$, and $R_3$ are H, methyl, ethyl, propyl, butyl, pentyl or hexyl group, X is a chloroaluminate. In one embodiment the X is $AlCl_4^-$, $Al_2Cl_7^-$, or $Al_3Cl_{10}^-$. In the formulas A and B, R, $R_1$, $R_2$ and $R_3$ may or may not be the same. In one embodiment the ionic liquid catalyst is N-butylpyridinium heptachlorodialtiminate [NBuPy$^+$][$Al_3Cl_7^-$]. In one embodiment the used ionic liquid catalyst is 1-Ethyl-3-methylimidazolium heptachlorodialuminate [emim$^+$][$Al_2Cl_7^-$].

Used Ionic Liquid Catalyst

After the ionic liquid catalyst has been used to catalyze a hydrocarbon conversion process it can become deactivated, or no longer needed, for further hydrocarbon conversions. We refer to this catalyst as used ionic liquid catalyst.

In one embodiment the used ionic liquid catalyst comprises a cation selected from the group of an alkyl-pyridinium, an alkyl-imidazolium, or a mixture thereof. In another embodiment the used ionic liquid catalyst can have the general formula RR'R"N H$^+$ $Al_2Cl_7^-$, wherein N is a nitrogen containing group, and wherein RR' and R" are alkyl groups containing 1 to 12 carbons, and where RR' and R" may or may not be the same.

In one embodiment, the used ionic liquid catalyst is the full charge from a hydrocarbon conversion process. In another embodiment, the used ionic liquid catalyst is a portion of the full charge of catalyst from a hydrocarbon conversion process. In one embodiment, less than a full charge of used ionic liquid catalyst is removed from a hydrocarbon conversion reactor or process unit such that the hydrocarbon conversion reactor or process unit operates continuously. The used ionic liquid catalyst can be drained from the process unit, and may also be referred to as spent ionic liquid catalyst. For example, the used ionic liquid catalyst can be less than 20 wt %, less than 15 wt %, less than 10 wt %, less than 5 wt %, or less than 1 wt % of the full charge of catalyst in the hydrocarbon conversion process unit. By removing less than the full charge of catalyst, the hydrocarbon conversion process can operate continuously, with gradual removal and addition of fresh or reactivated ionic liquid catalyst without stopping or disrupting the process.

Residual Hydrocarbon or Conjunct Polymer

In one embodiment the used ionic liquid catalyst additionally comprises residual hydrocarbon or conjunct polymer. Residual hydrocarbon or conjunct polymer can be formed and built up in the used ionic liquid catalyst during hydrocarbon conversion processes. The term conjunct polymer was first used by Pines and Ipatieff to distinguish these polymeric molecules from other polymers. Unlike some other polymers which are compounds formed from repeating units of smaller molecules by controlled or semi-controlled polymerizations, "conjunct polymers" are "pseudo-polymeric" compounds formed asymmetrically from two or more reacting units by concurrent acid-catalyzed transformations including polymerization, alkylation, cyclization, additions, eliminations and hydride transfer reactions. Consequently, the produced "pseudo-polymeric" may include a large number of compounds with varying structures and substitution patterns. The skeletal structures of "conjunct polymers", therefore, range from the very simple linear molecules to very complex multi-ring featured molecules. Some examples of the likely polymeric species in conjunct polymers were reported by Miron et. al. (Journal of Chemical and Engineering Data, 1963), and Pines (Chem. Tech., 1982). Conjunct polymers are also commonly known to those in the refining industry as "red oils" due to their reddish-amber color or "acid-soluble oils" due to their high uptake in the catalyst phase where paraffinic products and hydrocarbons with low olefinicity and low functional groups are usually immiscible in the catalyst phase. In this application, the term "conjunct polymers" also includes ASOs (acid-soluble-oils), red oils, and C12+ alkylates. Residual hydrocarbon can be unreacted starting materials from the hydrocarbon conversion process, or products from the hydrocarbon conversion process that are not separately collected.

One way to dispose of used ionic liquid catalyst is incineration. Incineration is not only an expensive disposal option but also the water-reactive nature of the used ionic liquid catalyst makes incineration difficult. As the used ionic liquid catalyst is exposed to the moisture during the incineration step, it can generate toxic and corrosive gas and corrosive materials that can damage the incineration equipment. Thus, there is a need for a safer and more cost efficient disposal process for used ionic liquid catalysts. We have found that spent ionic liquid catalyst can be converted to environmentally friendly materials by controlled hydrolysis and can be disposed of in a cost efficient manner.

Hydrolysis

The used ionic liquid is hydrolyzed with water or with a basic solution. The hydrolysis conditions can be chosen carefully so that the reaction heat is controlled and the hazardous gas formed during the hydrolysis is captured by the hydrolysis solution medium. In one embodiment, the hydrolysis uses a basic solution comprising water and a base that is strong enough to neutralize an acid formed by the used ionic liquid catalyst and water. In one embodiment the base that can be used for the hydrolysis is a base that hydrolyzes completely, and forms a basic solution with a pH of 10 or higher. Examples of bases include LiOH, NaOH, KOH, CsOH, RbOH, Mg(OH)$_2$, Ca(OH)$_2$, Sr(OH)$_2$, NH$_4$OH, Ba(OH)$_2$, and mixtures thereof. In one embodiment, the cation of the base is an alkali metal, an alkaline earth metal, or ammonium hydroxide. In another embodiment, the hydrolysis vessel holds a basic solution comprising a base selected from the group consisting of LiOH, NaOH, KOH, CsOH, RbOH, Mg(OH)2, Ca(OH)2, Sr(OH)2, NH4OH, Ba(OH)2, and mixtures thereof.

The basic solution can contain from 1 wt % to 60 wt % of the base, 5 wt % to 30 wt % of the base, 8 wt % to 25 wt % of the base, or 10 wt % to 20 wt % of the base, depending on the solubility and strength of the base used.

In one embodiment, the used ionic liquid catalyst and basic solution are mixed together at a molar ratio of used ionic liquid catalyst to base of 0.5:1 to 1:20, 1:1 to 1:15, or 1:1 to 1:10. The temperature under which the hydrolysis is performed is from −20° C. to 90° C. The pressure under which the hydrolysis is performed is from 80 to 2500 kPa. In one embodiment, the hydrolyzing is done at ambient temperature and pressure. In one embodiment, the hydrolyzing occurs in less than a week, less than 50 hours, and in some embodiments can occur in less than 10 hours, or less than 1 hour. In one embodiment the hydrolyzing occurs between 1 minutes and 60 minutes, between 10 minutes and 45 minutes, or between 15 minutes and 40 minutes. In one embodiment the hydrolysis proceeds continuously by adding used ionic liquid catalyst into the hydrolysis vessel while the hydrolyzed product is taken out. Residence time of the mixture of used ionic liquid catalyst and aqueous solution in the hydrolysis vessel of the continuous unit can range from 10 minutes to 10 hours.

In one embodiment the hydrolysis reaction can be controlled carefully in order to control the reaction temperature and pressure. To control the exotherm associated with the hydrolysis, one could adjust the feed rate of ionic liquid to the hydrolysis solution medium. A cooling coil can be added to control the hydrolysis temperature and to minimize the vaporization of hydrolysis medium, which is typically water. In some embodiments it is desirable to control the hydrolysis temperature to less than 90° C., less than 70° C., or less than 50° C.

The hydrolysis can be performed with or without stirring or with recirculation through a pump. In one embodiment the used ionic liquid catalyst is added slowly to the basic solution. Adding the used ionic liquid catalyst slowly can help control the hydrolysis temperature. The hydrolysis can be performed continuously, semi-continuously, or in batches.

In one embodiment, the vessel used for the hydrolyzing is fabricated of a metal, a plastic, a resin, or a glass. The vessel can be agitated or mixed by any suitable method such as stirring or recirculation around the vessel via a pump. In one embodiment the vessel is designed to give turbulent flow so that thorough mixing will result. Since the hydrolysis can be quite exothermic, in some embodiments, cooling coil(s) or fan(s) can be used to maintain the proper temperature.

After the hydrolysis, the final pH of the mixture of the used ionic liquid catalyst and the basic solution can be adjusted. Alternatively, the pH of the basic solution can be adjusted to reach a target pH for disposal. In one embodiment, the hydrolysis conditions are controlled to reach an acceptable, near neutral pH for the non-water-reactive aqueous phase. At a near neutral pH, the aqueous phase can be treated as a non-hazardous waste stream and can be sent to non-hazardous effluent waste handling facilities. In one embodiment, the pH of the non-water-reactive aqueous phase is 4 to 10, 5 to 9, or 6 to 8.

In one embodiment, a hydrogen halide gas is evolved during the hydrolysis and the hydrogen halide gas dissolves into the basic solution and is neutralized (i.e., reacted with the base). For example, when hydrolyzing a used ionic liquid catalyst comprising a chloroaluminate, hydrogen chloride can be evolved and dissolved into the basic solution. Capturing the hydrogen chloride into the basic solution and neutralizing it prevents the release of a toxic and corrosive gas into the atmosphere.

The hydrolysis step produces solid particles that form a slurry in the liquid phase. For example, when hydrolyzing a used ionic liquid catalyst comprising a chloroaluminate, a slurry containing solid precipitates comprising aluminum hydroxide, aluminum oxide and hydrated aluminum chloride forms.

Separation of Liquid and Solid Phases

The hydrolyzed product containing solid and liquid phases is separated by a separator, employing, for example, filtration or centrifugation to separate the liquid phase from the solid phase. In one embodiment, the liquid phase contains mostly residual hydrocarbon and the aqueous phase of the hydrolyzed product, which is non-water-reactive. In one embodiment, the separated liquid phase contains less than 5 wt %, less than 2 wt %, or less than 1 wt % of the solid material in the hydrolyzed product.

Either prior to or during the liquid-solid separation, an organic polymer or inorganic coagulant can be added to the hydrolyzed product to make the separation of the liquid phase from the solid phase more efficient and/or to reduce any chemically bound water in the solid phase.

Filtration can be a method used for separation of the hydrolyzed product into the liquid phase and the solid phase. Any filter and filter media that effects good separation of the liquid phase from the solid phase can be used. The filter is a semipermeable barrier placed perpendicular to or across a liquid flow. The filter media and depth is sized according to the size and amount of particles in the solid phase. In one embodiment, the filter is either a gravity or pressure rapid filter.

The filter can operate either up-flow, down-flow, or at angles in-between. Examples of filter media that can be used in the filter include a deep bed (e.g., greater than 3" up to 50") of sand or anthracite on a large particle bed support. Mixed media filter beds can also be used.

In one embodiment, the solid phase is rinsed with a hydrocarbon, water, or both to remove hydrocarbon products and/or water soluble products held in the solid phase. The rinsate can be added to the liquid phase or separately handled.

Solid Phase

The solid phase separated from the hydrolyzed product comprises a solid phase of the hydrolyzed product that is not water reactive. It can be safely handled or disposed of as waste or could be sent to a coker unit. In some embodiments, the solid phase requires no further processing to be disposed of in a landfill. In some embodiments the solid waste comprises residual materials that require it be disposed of as hazardous waste.

In one embodiment, the solid phase comprises reaction products formed by the hydrolysis of the anhydrous metal halide in the used ionic liquid. For example, when hydrolyzing a used ionic liquid catalyst comprising a chloroaluminate, a slurry containing solid precipitates comprising aluminum hydroxide, aluminum oxide and hydrated aluminum chloride forms. In one embodiment, greater than 75 wt %, greater than 80 wt %, or greater than 90 wt % of the anhydrous metal halide is hydrolyzed and collected in the solid phase. In one embodiment, the solid phase comprises less than 40 wt %, less than 30 wt %, or less than 20 wt % of water and residual hydrocarbon.

In one embodiment, the solid phase comprises metal that can come from one or more corrosion metals, or products thereof. Examples of corrosion metals are those included in steel alloys, such as Al, Co, Cr, Cu, Fe, Mn, Mo, Nb, Ni, Ti, V, W, and mixtures thereof. Examples of products of corrosion metals are metal hydroxides, oxides, or chlorides. Removal of the corrosion metals can make the liquid phase more suitable for waste effluent treatment or other uses.

Separating Hydrocarbon Phase from the Liquid Phase

In one embodiment, the liquid phase is further separated into an aqueous phase and a hydrocarbon phase in a liquid/liquid separator. The separating is done using any liquid/liquid separator that separates the components of the liquid phase between two immiscible solvent phases of different densities. The separating can be done using gravity, such as in a separatory funnel or dropping funnel. The separating can also be done using a centrifuge, especially where the volume to be separated is very large or the separation is desired to be done quickly, such as in less than an hour, less than 30 minutes, or less than 10 minutes.

The aqueous phase can be easily handled by several means, including by disposal as aqueous waste, sent to an effluent treatment facility, or sent to a facility to recover NaOH. The hydrocarbon phase can be used in subsequent refining operations as fuel or recycled in a refinery hydrocarbon pool. For example, the hydrocarbon phase can be separated and used as a solvent or feed to a refining process. In one embodiment, the hydrocarbon phase can be used as a feed for a coker unit, a feed to a base oil or distillate plant; or used as a fuel oil.

EXAMPLES

Example 1

Used Ionic Liquid Catalyst Comprising Anhydrous Metal Halide

In this example we used N-butylpyridinium heptachlorodialuminate ($C_5H_5NC_4H_9Al_2Cl_7$) ionic liquid catalyst. This catalyst had the following composition:

| Element | Wt % |
| --- | --- |
| Al | 12.4 |
| Cl | 56.5 |
| C | 24.6 |
| H | 3.2 |
| N | 3.3 |

The above catalyst was used for C3/C4 olefins alkylation with isobutane to make alkylate gasoline. During the alkylation the used catalyst accumulated 5 wt % of conjunct polymer. The used catalyst also accumulated trace amounts of Fe, Ni, Cu and Cr from corrosion byproducts in the alkylation process.

Example 2

Hydrolysis of Used Ionic Liquid Catalyst 173.3 g of 15 wt % NaOH solution was prepared in a 1 L beaker equipped with an overhead stirrer. While stirring, 58.66 g of the used ionic liquid catalyst from Example 1 was added slowly to the NaOH solution over a 36 minute period at a rate to control the exotherm from the hydrolysis to less than 50 deg C. A brown slurry was formed and the final pH of the solution with the brown slurry was about 5. The brown slurry was filtered to capture an aluminum hydroxide/oxide solid as a wet filter cake.

The filter cake was rinsed with heptane and de-ionized water to remove any strippable hydrocarbon from the filter cake and to add the strippable hydrocarbon to the liquid filtrate. 78.8 g of rinsed wet filter cake was recovered. The liquid filtrate was separated further to a hydrocarbon phase and an aqueous phase using a separatory funnel. The hydrocarbon phase was dried to remove the heptane solvent, and 0.34 g of heavy hydrocarbon having a brownish yellow color was recovered.

The boiling point distribution of the recovered hydrocarbon phase was measured by gas chromatography for high temperature distillation using ASTM D 6352-04 (Reapproved 2009), "Standard Test Method for Boiling Range Distribution of Petroleum Distillates in Boiling Range from 174 to 700° C. by Gas Chromatography", and the results are shown below.

| % | Temperature, C. (F.) |
| --- | --- |
| IBP | 204 (399) |
| 10 | 303 (578) |
| 30 | 354 (670) |
| 50 | 394 (742) |
| 70 | 443 (830) |
| 90 | 539 (1003) |
| FBP | 720 (1328) |

The boiling point distribution data showed that the recovered hydrocarbon phase had a final boiling point greater than 700 deg. C. This heavy hydrocarbon would be a useful product for many purposes, including a feed for a coker unit or a fuel oil.

Example 3

Material Balance of Hydrolyzed Product Streams

Elemental analyses of the aqueous phase and solid phase from Example 2 were performed. The elemental analysis showed that the aqueous phase contained mainly Na, Al, N, C, and very low corrosion metal ion concentrations (below instrument detection limits). The elemental analysis of the solid phase (rinsed wet filter cake) from Example 2 indicated that the bulk (i.e., greater than 70 wt %) of the corrosion metals were captured in the solid phase.

Elemental material balances around Example 2 were calculated to understand how the key elements of the feed composition of the used ionic liquid catalyst and basic solution were redistributed in the hydrolyzed product phases. The tables below show the distribution of key elements in the feeds (ionic liquid catalyst+NaOH solution) and in the resulting different hydrolyzed product phases (hydrocarbon phase, non-water-reactive aqueous phase, and the solid phase).

| Feed Composition: | | | |
| --- | --- | --- | --- |
| Element | Used Ionic Liquid Cat., Wt % | Conjunct Polymer, Wt % | NaOH Solution, Wt % |
| C | 86 | 14 | 0 |
| N | 100 | 0 | 0 |
| Cl | 99 | 1 | 0 |
| Al | 100 | 0 | 0 |
| Na | 0 | 0 | 100 |
| Fe | 100 | 0 | 0 |

| Product Composition: | | | |
| --- | --- | --- | --- |
| Element | Aqueous Phase, Wt % | Hydrocarbon Phase, Wt % | Solid Phase (Wet Filter Cake), Wt % |
| C | 68 | 2.1 | 30 |
| N | 52 | <1 | 48 |
| Cl | 82 | <1 | 18 |
| Al | 0.3 | <1 | 99.7 |
| Na | 84 | <1 | 16 |
| Fe | 3 | 0 | 97 |

The compositional analysis indicated that greater than 99.5 wt % of the anhydrous aluminum chloride in the used ionic liquid catalyst was converted to solids (e.g., aluminum hydroxide and aluminum oxide) and collected in the wet filter cake. It is believed that most of the N-butylpyridinium chloride stayed intact during the hydrolysis process. The compositional analysis suggested that over 50 wt % of the N-butylpyridinium chloride was dissolved in the aqueous phase and the rest was deposited on the wet filter cake. Most of the NaOH solution was converted to NaCl and was dissolved in the aqueous phase. Most of the corrosion metal products, as noted by Fe, were deposited in the solid phase that was collected in the wet filter cake.

The transitional term "comprising", which is synonymous with "including," "containing," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps "and those that do not materially affect the basic and novel characteristic(s) of the claimed invention.

For the purposes of this specification and appended claims, unless otherwise indicated, all numbers expressing quantities, percentages or proportions, and other numerical values used in the specification and claims, are to be understood as being modified in all instances by the term "about." Further-more, all ranges disclosed herein are inclusive of the endpoints and are independently combinable. Whenever a numerical range with a lower limit and an upper limit are disclosed, any number falling within the range is also specifically disclosed.

Any term, abbreviation or shorthand not defined is understood to have the ordinary meaning used by a person skilled in the art at the time the application is filed. The singular forms "a," "an," and "the," include plural references unless expressly and unequivocally limited to one instance.

All of the publications, patents and patent applications cited in this application are herein incorporated by reference in their entirety to the same extent as if the disclosure of each individual publication, patent application or patent was specifically and individually indicated to be incorporated by reference in its entirety.

This written description uses examples to disclose the invention, including the best mode, and also to enable any person skilled in the art to make and use the invention. Many modifications of the exemplary embodiments of the invention disclosed above will readily occur to those skilled in the art. Accordingly, the invention is to be construed as including all structure and methods that fall within the scope of the appended claims. Unless otherwise specified, the recitation of a genus of elements, materials or other components, from which an individual component or mixture of components can be selected, is intended to include all possible sub-generic combinations of the listed components and mixtures thereof.

What is claimed is:

1. A process for preparing a used catalyst for safe disposal, comprising:
   a. hydrolyzing a used ionic liquid catalyst comprising an anhydrous metal halide with a basic solution to produce a hydrolyzed product, wherein a hydrogen halide gas is evolved during the hydrolyzing and the hydrogen halide gas is dissolved into the basic solution to neutralize the hydrogen halide gas;
   b. separating the hydrolyzed product into a liquid phase and a solid phase; wherein the liquid phase comprises a non-water-reactive aqueous phase having a pH of 4 to 10 and a hydrocarbon phase; and wherein the solid phase is not water reactive.

2. The process of claim 1, wherein the used ionic liquid catalyst is selected from the group consisting of a hydrocarbyl-substituted-pyridinium chloroaluminate, a hydrocarbyl-substituted-imidazolium chloroaluminate, a quaternary amine chloroaluminate, a trialkyl amine hydrogen chloride chloroaluminate, an alkyl pyridine hydrogen chloride chloroaluminate, and mixtures thereof.

3. The process of claim 1, wherein the anhydrous metal halide is selected from the group consisting of $AlCl_3$, $AlBr_3$, $GaCl_3$, $GaBr_3$, $InCl_3$, $InBr_3$, and mixtures thereof.

4. The process of claim 1, wherein the hydrolyzing is done with a basic solution comprising a base selected from the group consisting of LiOH, NaOH, KOH, CsOH, RbOH, $Mg(OH)_2$, $Ca(OH)_2$, $Sr(OH)_2$, $NH_4OH$, $Ba(OH)_2$, and mixtures thereof.

5. The process of claim 1, wherein less than a full charge of the used ionic liquid catalyst is removed from a hydrocarbon conversion process unit such that the hydrocarbon conversion process unit operates continuously.

6. The process of claim 1, wherein the used ionic liquid catalyst comprises conjunct polymer.

7. The process of claim 1, additionally comprising separating the non-water-reactive aqueous phase from the hydrocarbon phase.

8. The process of claim 1, wherein the hydrolyzing proceeds continuously by adding the used ionic liquid catalyst to a hydrolysis vessel while the hydrolyzed product is taken out of the hydrolysis vessel.

9. The process of claim 1, wherein the used ionic liquid catalyst comprises one or more corrosion metals selected from the group consisting of Co, Cr, Cu, Fe, Mn, Mo, Nb, Ni, Ti, V, and W and the one or more corrosion metals, or products thereof, are collected in the solid phase.

10. The process of claim 1, wherein greater than 80 wt % of the anhydrous metal halide is hydrolyzed and collected in the solid phase.

11. The process of claim 1, wherein the used ionic liquid catalyst and the basic solution are mixed together at a molar ratio of used ionic liquid catalyst to a base of 0.5:1 to 1:20.

12. The process of claim 1, wherein a pH of the basic solution is adjusted to reach a target pH for disposal.

13. The process of claim 12, wherein the target pH for disposal enables the non-water-reactive aqueous phase to be sent to a non-hazardous effluent waste handling facility.

14. The process of claim 1, wherein the pH is 5 to 9.

15. The process of claim 1, wherein the solid phase contains solid precipitates comprising hydrated aluminum chloride.

16. The process of claim 1, wherein the hydrolyzing is performed with control of a hydrolysis temperature.

* * * * *